US012095358B2

(12) United States Patent
Fan et al.

(10) Patent No.: US 12,095,358 B2
(45) Date of Patent: Sep. 17, 2024

(54) INTERNAL RAMP VOLTAGE GENERATOR FOR THE SOFT START OF DC-DC CONVERTER

(71) Applicant: Reed Semiconductor Corporation, Warwick, RI (US)

(72) Inventors: Jiwei Fan, Cary, NC (US); Yingqian Ma, Shenzhen (CN); Yifan Dong, Shenzhen (CN)

(73) Assignee: Reed Semiconductor Corporation, Warwick, RI (US)

( * ) Notice: Subject to any disclaimer, the term of this patent is extended or adjusted under 35 U.S.C. 154(b) by 248 days.

(21) Appl. No.: 17/658,920

(22) Filed: Apr. 12, 2022

(65) Prior Publication Data

US 2023/0327542 A1 Oct. 12, 2023

(51) Int. Cl.
*H02M 1/36* (2007.01)
*H02M 3/07* (2006.01)
*H02M 3/158* (2006.01)

(52) U.S. Cl.
CPC ............. *H02M 1/36* (2013.01); *H02M 3/07* (2013.01); *H02M 3/158* (2013.01)

(58) Field of Classification Search
CPC .......... H02M 1/36; H02M 3/07; H02M 3/158
USPC ......................................................... 323/288
See application file for complete search history.

(56) References Cited

U.S. PATENT DOCUMENTS

| | | | | |
|---|---|---|---|---|
| 7,408,332 | B2 * | 8/2008 | Yee | H02M 3/156 323/282 |
| 10,468,978 | B2 * | 11/2019 | Zhang | H02M 3/073 |
| 2004/0022078 | A1 * | 2/2004 | Shieh | H02M 1/32 363/49 |
| 2019/0229613 | A1 * | 7/2019 | Wiedenbauer | H02M 1/36 |

* cited by examiner

*Primary Examiner* — Yemane Mehari
(74) *Attorney, Agent, or Firm* — AP3 Law Firm PLLC

(57) ABSTRACT

A ramp generator for and method of generating a voltage ramp signal with very long ramping up time on a silicon chip, wherein the method includes a control loop providing a switched-capacitor circuit for generating the voltage ramp signal.

5 Claims, 2 Drawing Sheets

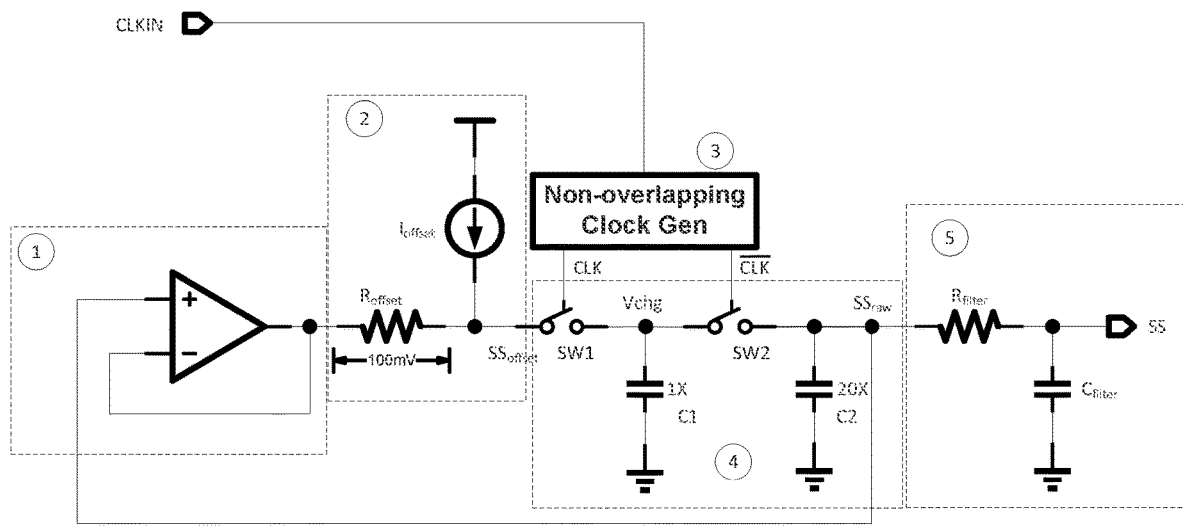
Figure 1: circuit

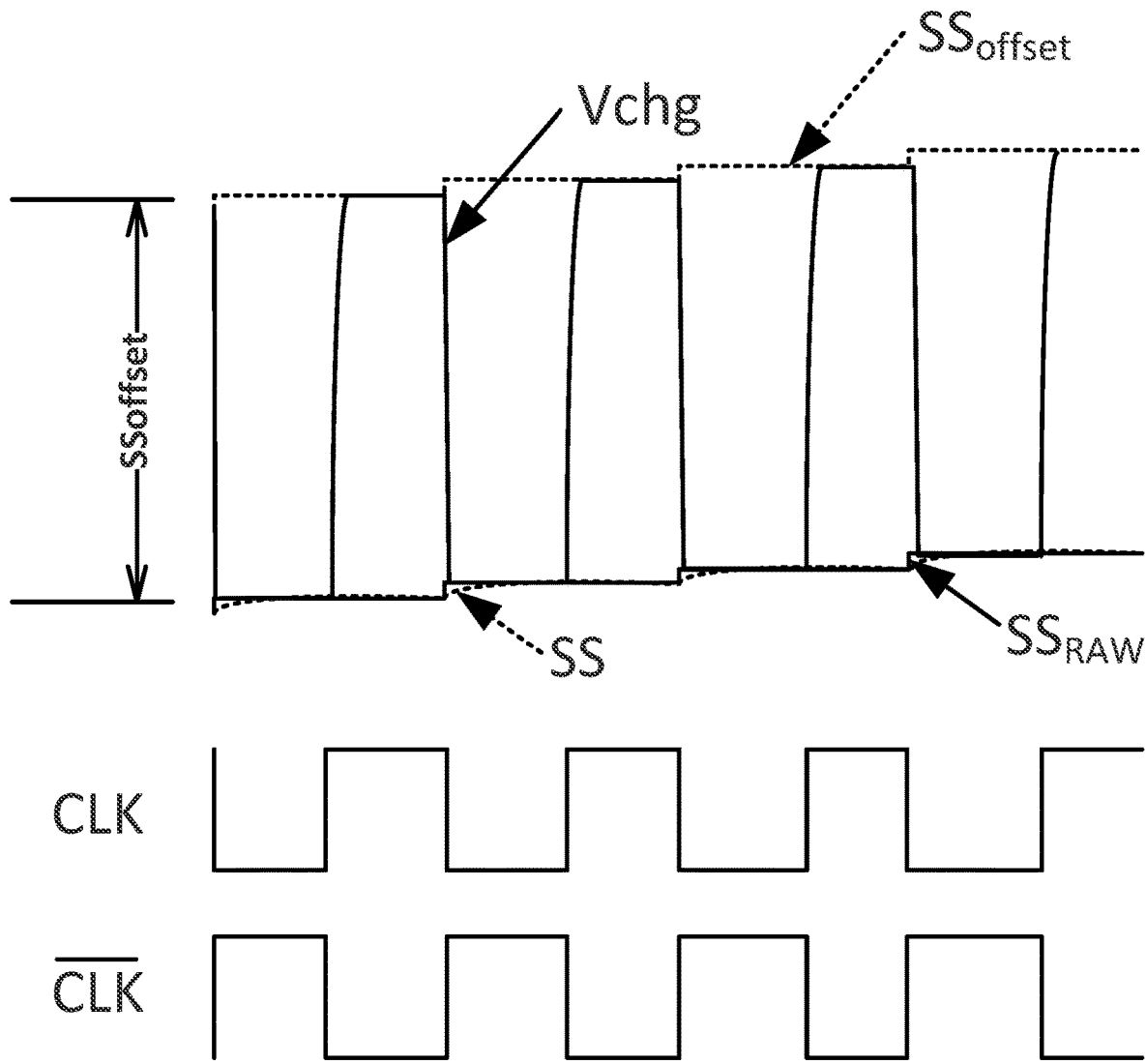
Figure 2: Waveforms

INTERNAL RAMP VOLTAGE GENERATOR FOR THE SOFT START OF DC-DC CONVERTER

BACKGROUND OF THE INVENTION

The present invention relates to DC-DC converters and, more particularly, an internal ramp voltage generator for the soft start of a DC-DC converter.

In DC-DC converters, the output voltage needs to ramp up slowly to the final target voltage to avoid the big in rush current. To do this, one needs a soft start voltage ramp signal which ramps up very slowly from zero volts to the target reference voltage. For some chips, we need to generate this voltage on-chip.

One solution found in the prior art is to generate the internal on-chip soft start voltage ramp is using a large impedance element (e.g., a resistor having a range of values between 100K and 10 Meg ohms) and large capacitance storage element (e.g., a capacitor having a range of values between 10p and 100p farads) to make a slow ramping up voltage. Such large elements require a relatively large chip area which means high cost. And the soft start time, which is determined by the ramping up time, varies a lot with the resistance and capacitance change. Furthermore, such large impedance and capacitance elements can change with process corners and temperature. The variation can be as high as 50%.

Another prior art solution is to use a complicated DAC to achieve the slow ramping up time. This DAC solution also needs a relatively large chip area to achieve millivolt level output accuracy and the circuit is very complicated, as there needs to be an accurate bandgap circuit and complicated resistor and switch network to make the DAC. A digital counter is also needed to change the time information from clock to digital numbers. In short, the DAC step accuracy requirements demands large chip area.

As can be seen, there is a need for a ramp generator for and method of generating a voltage ramp signal with very long ramping up time on a silicon chip.

The ramp generator embodied in the present invention uses a voltage buffer to sense the ramp voltage. A fixed voltage offset is added to this sensed ramp voltage. The buffered ramp voltage plus the fixed offset is used to charge a smaller capacitor in half of the clock cycle. And in the other half of the clock cycle, this smaller capacitor is disconnected from the ramp voltage buffer and connected to a bigger capacitor which is always connected to the raw signal of the voltage ramp.

As a result, every clock cycle, the ramp signal will just rise a few millivolts. And after a low pass filter, the ramp voltage can be achieved with very long ramping up time and smooth raising voltage waveform.

The present invention is based on a charge redistribution method. There is no need of any large resistive or capacitance element, and thus the circuit is much smaller than the prior art. The ramping up time is also well controlled, generating a consistently accurate voltage ramp signal.

SUMMARY OF THE INVENTION

In one aspect of the present invention, a soft start circuit provides a soft start signal coupled to a control loop, wherein the control loop includes the following: a buffer sampling the soft start signal; a fixed offset generator, wherein the fixed offset generator is coupled to the output of the buffer; a switched-capacitor circuit having an input directly coupled to an output of the fixed offset generator; and a clock generator controlling the switched-capacitor circuit, wherein the switched-capacitor circuit outputs a final soft start ramp voltage.

In another aspect of the present invention, the soft start circuit further provides a low pass filter interconnecting the switched-capacitor circuit the final soft start ramp voltage, wherein the low pass filter is implemented through a switched-capacitor configuration.

In yet another aspect of the present invention, a method for generating a voltage ramp signal for a DC-DC converter includes the following: sampling of a soft start signal; adding a fixed offset to the sampled soft start signal to produce a resultant; and filtering the resultant by way of a switched-capacitor element.

These and other features, aspects and advantages of the present invention will become better understood with reference to the following drawings, description and claims.

BRIEF DESCRIPTION OF THE DRAWINGS

FIG. 1 is a schematic view of an exemplary embodiment of the present invention.

FIG. 2 illustrates voltage waveforms of an exemplary embodiment of the present invention.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, an embodiment of the present invention provides a ramp generator for and method of generating a voltage ramp signal with very long ramping up time on a silicon chip, wherein the method includes a control loop providing a switched-capacitor circuit for generating the voltage ramp signal.

Referring now to FIG. 1, the present invention may include a Soft Start (SS) voltage buffer 1, a fixed offset generator 2, a clock generator 3, a switched-capacitor circuit 4, and a low pass filter 5 for the final soft start ramp voltage.

The switched-capacitor circuit 4 intermittently transfers charges using only switches and capacitors to perform voltage modulation through charge redistribution via a capacitor network driven by the clock generator 3. The capacitor network may include C1 and C2. A switched-capacitor circuit is a discrete-time circuit that exploits the charge transfer in and out of C1 as controlled by switches SW1 and SW2. The switching activity is generally controlled by well-defined, non-overlapping clock generator 3 such that the charge transfer in and out is well defined and deterministic.

The switched-capacitor circuit 4 may be implemented using metal-oxide-semiconductor (MOS) technology, with MOS capacitors and MOS field-effect transistor (MOSFET) switches and may be fabricated using the complementary MOS (CMOS) process.

The low pass filter 5 may be implemented by the switched-capacitor circuit 4, making it, in certain embodiments, a "switched-capacitor filter" that is a function of only of the ratios between capacitances. In one embodiment, C2 has approximately two to one-hundred times the capacitive storage of C1. Thereby making the present invention more suitable for use within integrated circuits, where accurately specified resistors and capacitors (such as found in the prior art) are not economical to construct.

Referring now to FIG. 2, the present invention provides waveforms at the beginning of the soft start, wherein the voltages on C1, C2 and Cfilter are all zero. Vchg=SSraw=0. The SSoffset is Ioffset*Roffset.

The waveforms further illustrate that when the CLKIN starts to toggle, and CLK is high, the Vchg is charged to the SSoffset=zero+Ioffset*Roffset. And C2 and Cfilter keep at zero. It is understood that the offsets from the Figures may range zero to The waveforms show that when the CLK goes low and CLK_ goes high, the C1 is disconnected from SSoffset and connected to C2 through SW2. The charge on C1 is now transferred to both C1 and C2. After the charge redistribution, the SSraw voltage after the first clock period is SSraw(1)=(C1*Ioffset*Roffset)/(C1+C2).

For the nth CLKIN cycle, when CLK is high, the Vchg(n)=SSraw(n)+Ioffset*Roffset. The voltage across the C2 is SSraw(n). When CLK_ is high, C1 is disconnected from the SSoffset and the charges on C1 and C2 are redistributed. The charge before and after the redistribution are on the left and right side of the equation shown below:

$$C1*(SSraw(n)+Ioffset*Roffset)+C2*SSraw(n)=(C1+C2)*SSraw(n+1)$$

So, SSraw of the n+1 CLKIN cycle is:

$$SSraw(n+1)=SSraw(n)\pm(C1*Ioffset*Roffset)/(C1+C2)$$

For each CLKIN cycle, the SSraw will rise by a small step which is Step=(C1*Ioffset*Roffset)/(C1+C2).

The SSraw will ramp up by the step voltage shown above for each CLKIN. To smooth out the small voltage step change, the low pass filter Rfilter and Cfilter is added. The SS output is the smooth soft start voltage for the DC-DC converter loop.

If the final reference voltage is VREF, and period of the CLKIN is TCLKIN, the total soft start time, TSS, is:

$$TSS=Vref/step*TCLKIN$$

As a result, the TSS can be well controlled on the chip.

A method of arranging the soft start circuit embodied in the present invention includes connecting the output SS signal to the control loop and letting the output voltage of the DC-DC converter follow the slowly changed SS voltage until the output voltage reaches the target value. Some digital setup circuit can be added to adjust the frequency of the CLKIN or the value of the offset voltage, whereby the soft start ramps up time can be adjusted.

A method of using the present invention may include the following. A user may replace a pre-existing soft start circuit of a DC-DC converter with the soft start circuit disclosed herein. The user may deploy the soft start circuit in a monolithic Power Converter, a DC-DC Power Supply, and a DC-DC controller.

As used in this application, the term "about" or "approximately" refers to a range of values within plus or minus 10% of the specified number. And the term "substantially" refers to up to 90% or more of an entirety. Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

It should be understood, of course, that the foregoing relates to exemplary embodiments of the invention and that modifications may be made without departing from the spirit and scope of the invention as set forth in the following claims.

What is claimed is:

1. A soft start circuit, comprising:
   a soft start signal coupled to a control loop, the control loop comprising:
      a buffer sampling the soft start signal;
      a fixed offset generator, wherein the fixed offset generator is coupled to the output of the buffer;
      a switched-capacitor circuit having an input directly coupled to an output of the fixed offset generator, wherein the switched-capacitor circuit comprises a first switch, a first capacitor, a second switch and a second capacitor, and wherein the first switch and the second switch are connected in series between the input and an output of the switched-capacitor circuit, the first capacitor is connected between a common node of the first switch and the second switch, and ground, and the second capacitor is connected between the output of the switched-capacitor circuit and ground; and
   a clock generator controlling the switched-capacitor circuit, wherein the switched-capacitor circuit outputs a final soft start ramp voltage.

2. The soft start circuit of claim 1, further comprising a low pass filter interconnecting the switched-capacitor circuit to the final soft start ramp voltage.

3. The soft start circuit of claim 2, wherein the low pass filter is a resistor.

4. The soft start circuit of claim 3, wherein the low pass filter is directly coupled to the switched-capacitor circuit.

5. A method for generating a voltage ramp signal for a DC-DC converter, the method comprising:
   sampling of a soft start signal;
   adding a fixed offset to the sampled soft start signal to produce a resultant; and
   generating a final soft start ramp voltage through processing the resultant in a switched-capacitor circuit comprising a first switch, a first capacitor, a second switch and a second capacitor, wherein the first switch and the second switch are connected in series between the input and an output of the switched-capacitor circuit, the first capacitor is connected between a common node of the first switch and the second switch, and ground, and the second capacitor is connected between the output of the switched-capacitor circuit and ground.

* * * * *

UNITED STATES PATENT AND TRADEMARK OFFICE
CERTIFICATE OF CORRECTION

| | |
|---|---|
| PATENT NO. | : 12,095,358 B2 |
| APPLICATION NO. | : 17/658920 |
| DATED | : September 17, 2024 |
| INVENTOR(S) | : Jiwei Fan, Yingqian Ma and Yifan Dong |

It is certified that error appears in the above-identified patent and that said Letters Patent is hereby corrected as shown below:

In the Claims

Column 4, Line 46, cancel the text beginning with "3. The soft" and ending with "resistor." in Line 47, and insert the following claim:
--3. The soft start circuit of claim 2, wherein the low pass filter is a resistor-capacitor filter.--

Signed and Sealed this
Fifth Day of November, 2024

Katherine Kelly Vidal
*Director of the United States Patent and Trademark Office*